US008094979B2

(12) United States Patent
Safrani et al.

(10) Patent No.: US 8,094,979 B2
(45) Date of Patent: Jan. 10, 2012

(54) POLARIZATION-BASED OPTICAL SWITCHING

(75) Inventors: Avner Safrani, Beer Sheva (IL); Moshe Gottlieb, Omer (IL)

(73) Assignee: Teliswitch Solutions Ltd., Kfar Saba (IL)

( * ) Notice: Subject to any disclaimer, the term of this patent is extended or adjusted under 35 U.S.C. 154(b) by 173 days.

(21) Appl. No.: 12/221,870

(22) Filed: Aug. 6, 2008

(65) Prior Publication Data

US 2009/0052837 A1    Feb. 26, 2009

Related U.S. Application Data

(60) Provisional application No. 60/954,672, filed on Aug. 8, 2007.

(51) Int. Cl.
*G02B 6/26* (2006.01)
*G02B 6/42* (2006.01)
(52) U.S. Cl. .............. 385/18; 385/11; 385/16; 385/17
(58) Field of Classification Search .................. None
See application file for complete search history.

(56) References Cited

U.S. PATENT DOCUMENTS

| | | | | |
|---|---|---|---|---|
| 4,948,229 A | * | 8/1990 | Soref | ............. 385/16 |
| 5,724,165 A | | 3/1998 | Wu | |
| 5,946,116 A | | 8/1999 | Wu et al. | |
| 6,049,404 A | * | 4/2000 | Wu et al. | ............. 385/16 |
| 6,141,076 A | | 10/2000 | Liu et al. | |
| 6,175,432 B1 | | 1/2001 | Wu et al. | |
| 6,275,312 B1 | | 8/2001 | Derks et al. | |
| 6,337,934 B1 | | 1/2002 | Wu et al. | |
| 6,452,702 B1 | | 9/2002 | Wu et al. | |
| 6,519,022 B1 | | 2/2003 | Xu et al. | |
| 6,807,329 B2 | | 10/2004 | Zalevsky et al. | |
| 6,859,573 B2 | | 2/2005 | Bouevitch et al. | |
| 6,992,748 B2 | * | 1/2006 | Koh et al. | ............. 349/196 |
| 6,999,649 B1 | | 2/2006 | Chen et al. | |
| 7,224,860 B2 | | 5/2007 | Zhao et al. | |
| 2007/0140620 A1 | | 6/2007 | Schorpp et al. | |

FOREIGN PATENT DOCUMENTS

JP          03-101716 A  * 4/1991
* cited by examiner

*Primary Examiner* — Uyen Chau N Le
*Assistant Examiner* — Chad Smith
(74) *Attorney, Agent, or Firm* — D. Kligler IP Services Ltd.

(57) ABSTRACT

An optical switch, comprising a plurality of light inputs and a plurality of light outputs. The switch additionally includes a polarization beam splitter, configured to split light beams received through the input carriers into separate first and second polarization components and a plurality of semi-transparent mirrors and polarization rotators arranged to allow controllable deflection of the first and second polarization components from the beam splitter to a selected one of the light outputs, wherein the one or more different planes defined for at least 15% of the semi-transparent mirrors by the possible paths of the first polarization component passing through the semi-transparent mirror in the arrangement do not coincide with planes defined by the possible paths of the second polarization component passing through any of the semi-transparent mirrors in the arrangement. A controller of the switch is adapted to control the beam rotators in order that the semi-transparent mirrors deflect beams from desired inputs to desired outputs.

33 Claims, 7 Drawing Sheets

POLARIZATION-BASED OPTICAL SWITCHING

PRIORITY INFORMATION

The present invention claims priority to Provisional Patent Application No. 60/954,672 filed on Aug. 8, 2007, claiming benefit under 35 USC 119(e).

FIELD OF THE INVENTION

The present invention relates to communication systems and in particular to optical communication systems.

BACKGROUND OF THE INVENTION

Optical fibers, carrying modulated light signals, are one of the basic communication mediums. In order to allow flexibility in communications, an efficient switching method, which allows coupling different optical fibers to each other at different times, is required. Mechanical switching methods which physically move one of the fibers into alignment with one of a plurality of other fibers are relatively slow and expensive. Other switching methods include converting the light signal received from a first optical fiber into an electrical signal, performing electronic switching and then regenerating a light signal from the electrical signal into another optical fiber. This method is costly and is limited in the bandwidth it can carry and the switching speeds at which it can operate.

Another switching method uses the polarization of the light signal to selectively transfer an input signal to an output optical fiber.

In some implementations, an input light signal is decomposed into two orthogonally polarized beams, for example, by a birefringent element. The polarization of one of the beams is rotated, for example by a waveplate, and the two orthogonally polarized beams are directed in parallel through one or more controllable polarization beam splitters (PBS), which are controlled to direct the parallel beams to a desired output. The beams are then combined and forwarded to their destination. Switches of this type are described, for example, in U.S. Pat. No. 6,992,748 to Koh et al., titled "Scaleable and Mass Manufacturable OXC Using Liquid Crystal Cells", U.S. Pat. No. 6,141,076 to Liu et al., titled "Spatial Light Modulators Constructed from Ferroelectric Liquid crystal Devices with Twisted Structure", U.S. Pat. No. 6,519,022 to Xu et al., titled "Optical Routing Switch using Symmetric Liquid Crystal Cells", U.S. Pat. No. 5,724,165 to Wu, titled "Fault Tolerant Optical Routing Switch", U.S. Pat. No. 5,946,116 to Wu et al., titled "1×N Digitally Programmable Optical Routing Switch", U.S. Pat. No. 7,224,860 to Zhao et al., titled "Multi-Port Optical Switches", U.S. Pat. No. 6,175,432 to Wu et al., titled "Multi-Wavelength Cross-Connect Optical Network" and U.S. Pat. No. 6,275,312 to Derks et al., titled "Optical Routing Switch", the disclosures of all of which are incorporated herein by reference in their entirety.

U.S. Pat. No. 6,452,702 to Wu et al., titled "N×M Digitally Programmable Optical Routing Switch" and U.S. Pat. No. 6,337,934 to Wu et al., titled "N×N Switch Array with Polarization Displacer", the disclosures of both of which are incorporated herein by reference in their entirety, describe a switching array of N×N PBSs, which can be used to selectively direct the parallel beams of any one of N inputs to any one of N outputs.

U.S. Pat. No. 6,807,329 to Zalevsky et al., titled "Method and Device for Polarization-Based All-Optical Switching", the disclosure of which is incorporated herein by reference, describes another switching approach using polarization control. The input beam is split into two orthogonally polarized beams, which are then directed perpendicular to each other to different controllable rotating elements (CPRs). The optical paths of the resulting beams are then combined. A cascading method is used to generate a 1×N or 2×N optical switch.

These devices suffer from losses and cross-talk and require improvement. In addition, in those embodiments which allow N×M switching, the size of the switch is relatively large degrading its performance or even making its use impracticable for some applications.

SUMMARY OF THE INVENTION

An aspect of some embodiments of the present invention relates to a polarization-based optical switch which is designed to direct the different polarization beam components of a switched beam in different planes. Directing the different beam components in different planes allows for a relatively large distance between the components in order to reduce crosstalk, while keeping the area of the switch and the lengths of the paths of the switched beams, relatively small.

Optionally, the orthogonally polarized beams propagate substantially parallel to each other in their respective planes over a substantial portion (e.g., more than 40% or even more than 70%) of their separate paths. The orthogonally polarized beams are optionally distanced from each other sufficiently in order to avoid substantial cross-talk between the orthogonally polarized beams. In an exemplary embodiment of the invention, the beams are distanced from each other by at least 0.2 mm, at least 0.5 millimeters, or even at least 1 centimeter, over at least 20%, 40% or even at least 60% of their optical path.

In an exemplary embodiment of the invention, the optical switch comprises a rectangular array of semi-transparent mirrors which controllably deflect beams from a plurality of inputs to a plurality of outputs. The different polarization beam components are optionally directed within different planes along the rectangular array. In some embodiments of the invention, the different polarization beam components propagate through separate planes of a single array of semi-transparent mirrors. Alternatively, the different polarization beam components propagate through separate arrays of semi-transparent mirrors.

An aspect of some embodiments of the present invention relates to a polarization-based optical switch which passes the orthogonally polarized beam components through separate optical paths including one or more separate switching elements. Directing the orthogonally polarized beams through separate switching elements allows using small switching elements (e.g., having less than 2 millimeters or even less than one millimeter for their long side), while still achieving a sufficiently large separation between the beams, to avoid cross-talk.

In some embodiments of the invention, the orthogonally polarized beams are directed in parallel to each other over at least a portion of their optical paths, optionally over at least 20%, 40% or even over 60% of their optical paths.

In some embodiments of the invention, the orthogonally polarized beams pass separately through a plurality of switching elements before they are recombined, rather than being recombined after each switching element.

The separate elements for the separate beams are optionally controlled together. Alternatively or additionally, the separate elements are located in different units.

Optionally, a PBS is used to separate the input beam into the orthogonally polarized beams.

An aspect of some embodiments of the invention relates to a polarization-based optical switch which is designed to direct the different polarization beam components of switched beams within areas separated by an opaque layer, thereby preventing cross-talk between the beam components.

An aspect of some embodiments of the invention relates to an optical switch which operates based on selective deflection of polarized light beams. The optical switch includes a three dimensional array of semi-transparent mirrors. Using a three dimensional array allows switching a larger number of inputs and outputs for a given maximal light path within the switch, relative to two-dimensional arrays.

The term two-dimensional rectangular array refers herein and in the claims to a rectangular array of elements having a plurality of rows, each of which having a plurality of columns of elements. The term three-dimensional array refers to a rectangular array in which there are a plurality of elements in each row, column and depth.

There is therefore provided in accordance with an exemplary embodiment of the invention, an optical switch, comprising a plurality of light inputs, a plurality of light outputs, a polarization beam splitter, configured to split light beams received through the input carriers into separate first and second polarization components, a plurality of semi-transparent mirrors and polarization rotators arranged to allow controllable deflection of the first and second polarization components from the beam splitter to a selected one of the light outputs, wherein the one or more different planes defined for at least 15% of the semi-transparent mirrors by the possible paths of the first polarization component passing through the semi-transparent mirror in the arrangement do not coincide with planes defined by the possible paths of the second polarization component passing through any of the semi-transparent mirrors in the arrangement and a controller adapted to control the beam rotators in order that the semi-transparent mirrors deflect beams from desired inputs to desired outputs.

Optionally, the one or more different planes defined for at least 30% of the semi-transparent mirrors by the possible paths of the first polarization component passing through the semi-transparent mirror in the arrangement do not coincide with planes defined by the possible paths of the second polarization component passing through any of the semi-transparent mirrors in the arrangement.

Optionally, the planes defined for each of the semi-transparent mirrors by the possible paths of the first polarization component passing through the semi-transparent mirror in the arrangement do not coincide with planes defined by the possible paths of the second polarization component passing through any of the semi-transparent mirrors in the arrangement. Optionally, the planes defined for the semi-transparent mirrors through which the first component may pass in the arrangement, by the possible paths of the first polarization component passing through the semi-transparent mirror in the arrangement, are included in a plurality of different planes which do not coincide.

Optionally, the planes defined for the semi-transparent mirrors through which the first component may pass in the arrangement, by the possible paths of the first polarization component passing through the semi-transparent mirror in the arrangement, are included in at least two substantially orthogonal planes. Optionally, the planes defined for at least 80% of the semi-transparent mirrors through which the first component may pass in the arrangement, by the possible paths of the first polarization component passing through the semi-transparent mirror in the arrangement, are included in a single plane.

Optionally, the planes defined by all the semi-transparent mirrors through which the first component may pass in the arrangement, by the possible paths of the first polarization component passing through the semi-transparent mirror in the arrangement, are included in a single first plane. Optionally, the planes defined for at least 80% of the semi-transparent mirrors through which the second component may pass in the arrangement, by the possible paths of the second polarization component passing through the semi-transparent mirror in the arrangement, are included in a single second plane. Optionally, the first and second planes are parallel.

Optionally, the plurality of light inputs comprise at least four inputs and the plurality of outputs comprise at least four outputs. Optionally, the polarization beam splitter comprises a semi-transparent mirror. Optionally, the arrangement of semi-transparent mirrors and polarization rotators comprises two layers of optical elements separated by an opaque layer, in the wavelengths of light beams for which the switch is designed. Optionally, the semi-transparent mirrors and polarization rotators are arranged to direct the first and second polarization components distanced from each other by at least 300 microns, over at least 50% of their propagation distance within the switch. Optionally, the semi-transparent mirrors and polarization rotators are arranged to direct the first and second polarization components distanced from each other by at least 300 or even at least 500 microns, over at least 50% or even at least over 80% of their propagation distance within the switch.

Optionally, the semi-transparent mirrors are arranged in a rectangular array. Optionally, the semi-transparent mirrors and polarization rotators are arranged to direct the first and second polarization components such that the maximal number of times a polarization component is deflected within the switch is less than 10. Optionally, the semi-transparent mirrors and polarization rotators are arranged to direct the first and second polarization components such that the maximal number of times a polarization component is deflected within the switch is less than six. Optionally, the semi-transparent mirrors and polarization rotators are arranged such that the separate polarization beams each pass through at least one separately controlled polarization rotator through which the other polarization component does not pass. Optionally, the semi-transparent mirrors and polarization rotators are arranged such that the first and second polarization components each pass through at least five separately controlled polarization rotators through which the other polarization component does not pass.

There is further provided in accordance with an exemplary embodiment of the invention, a method of optical beam switching, comprising receiving an input light beam, separating the light beam into first and second separate polarization components; directing the first and second polarization components through respective paths of semi-transparent mirrors and controllable polarization rotators, toward one of a plurality of outputs, wherein at least one of the planes defined by the first component at a deflection point along its path, does not coincide with any of the planes defined by the second component at its deflection points; combining the separate polarization components into a combined beam; and directing the combined beam through the one of the outputs.

Optionally, none of the planes defined by the first component at deflection points along its path coincide with any of the planes defined by the second component at its deflection points.

Optionally, the planes defined by the first component at deflection points along its path are all included in a single first plane. Optionally, the planes defined by the second component at deflection points along its path are all included in a single second plane. Optionally, the first and second single planes are parallel to each other. Optionally, the separate polarization components are distanced from each other by at least 300 microns over most of their separate propagation paths. Optionally, the separate polarization components propagate on opposite sides of an opaque separator over most of their separate propagation paths.

Optionally, separating the light beam into a plurality of separate polarization components comprises separating by a birefringant element or by a polarization beam splitter.

Optionally, the path of the first component includes at most eight deflection points.

There is further provided in accordance with an exemplary embodiment of the invention, an optical switch, comprising a plurality of light inputs, a plurality of light outputs, a polarization beam splitter, configured to split beams received through the input carriers into separate first and second polarization components, a plurality of semi-transparent mirrors and polarization rotators arranged to allow controllable deflection of the first and second polarization components from the beam splitter to a selected one of the light outputs, wherein the first and second components are directed at least along 20% of their paths on opposite sides of an opaque layer in the wavelengths for which the switch is designed and a controller adapted to control the beam rotators in order that the semi-transparent mirrors deflect beams from desired inputs to desired outputs.

Optionally, the first and second components are directed at least along 80% of their paths on opposite sides of the opaque layer.

There is further provided in accordance with an exemplary embodiment of the invention, an optical switch, comprising a plurality of light inputs, a plurality of light outputs, a polarization beam splitter, configured to split beams received through the input carriers into separate first and second polarization components, a plurality of semi-transparent mirrors and polarization rotators arranged to allow controllable deflection of the first and second polarization components from the beam splitter to a selected one of the light outputs, wherein, in the arrangement, the first and second components pass on opposite sides of at least one of the polarization rotators and a controller adapted to control the beam rotators in order that the semi-transparent mirrors deflect beams from desired inputs to desired outputs.

Optionally, in the arrangement, the first and second components of at least 50% of the input beams pass on opposite sides of at least five of the polarization rotators.

There is further provided in accordance with an exemplary embodiment of the invention, an optical switch, comprising a plurality of light inputs, a plurality of light outputs, a polarization beam splitter, configured to split beams received through the input carriers into separate polarization component beams, a three-dimensional rectangular parallelepiped (Cuboid) array of semi-transparent mirrors and polarization rotators arranged to allow controllable deflection of the separate polarization components from the beam splitter to the output beam carriers; and a controller adapted to control the beam rotators to deflect beams from desired input beam carriers to desired output beam carriers. Optionally, the three-dimensional rectangular parallelepiped array of semi-transparent mirrors includes semi-transparent mirrors oriented in at least two different directions. Optionally, three-dimensional rectangular parallelepiped array of semi-transparent mirrors includes semi-transparent mirrors oriented in at least three different directions.

Optionally, the plurality of output light beam carriers comprises a two dimensional rectangular array of light beam carriers. Optionally, the three-dimensional rectangular parallelepiped array of semi-transparent mirrors comprises a three-dimensional repetitious array of semi-transparent mirror units including a plurality of semi-transparent mirrors oriented in different directions.

BRIEF DESCRIPTION OF FIGURES

Exemplary non-limiting embodiments of the invention will be described with reference to the following description in conjunction with the figures. Identical structures, elements or parts which appear in more than one figure are preferably labeled with a same or similar number in all the figures in which they appear, in which.

DETAILED DESCRIPTION OF EMBODIMENTS

Switch Overview

Figure 1A:
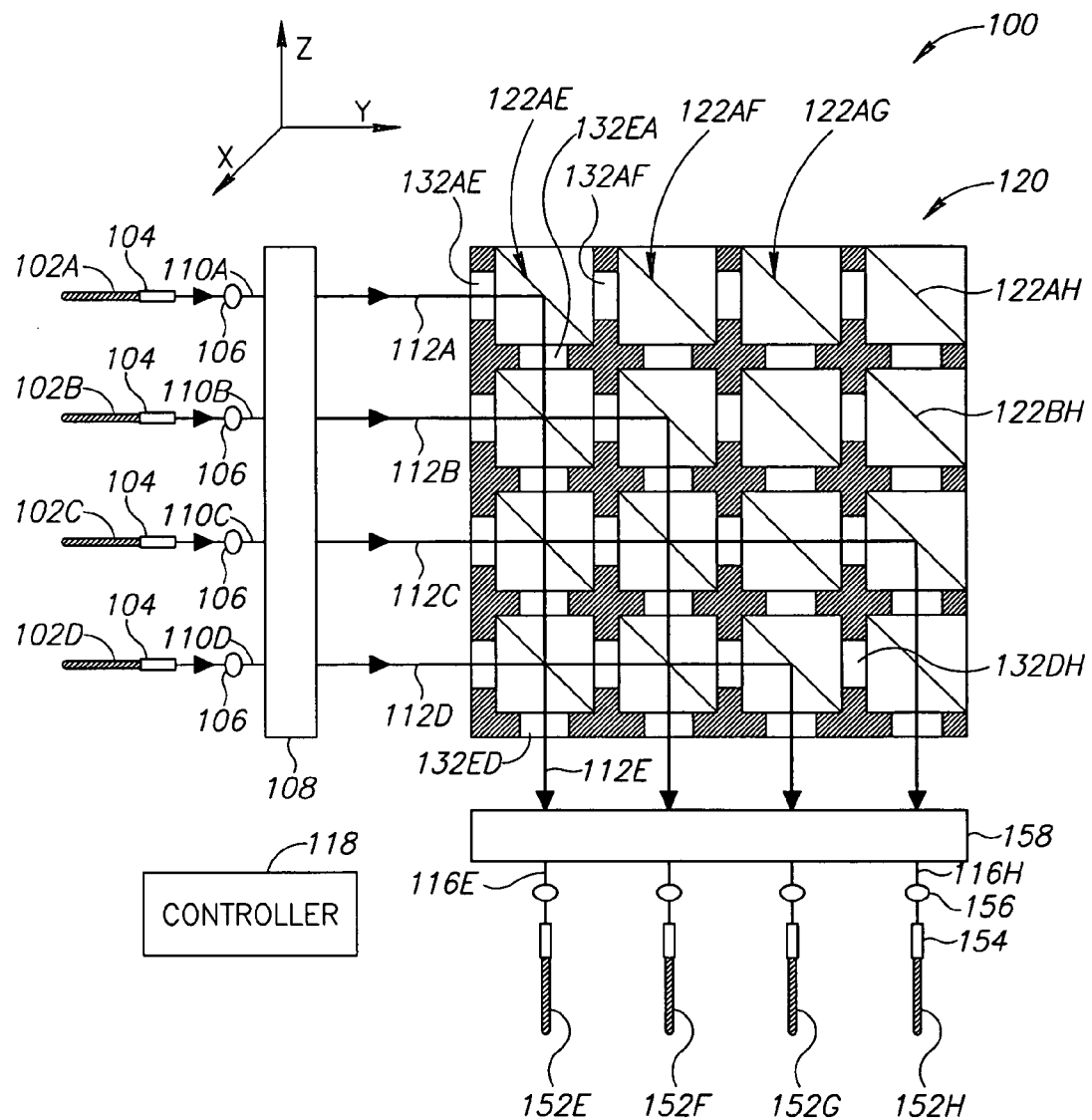
FIGS. 1A-1C show from different directions, a 4×4 optical switch, in accordance with an exemplary embodiment of the invention
Figure 1B:
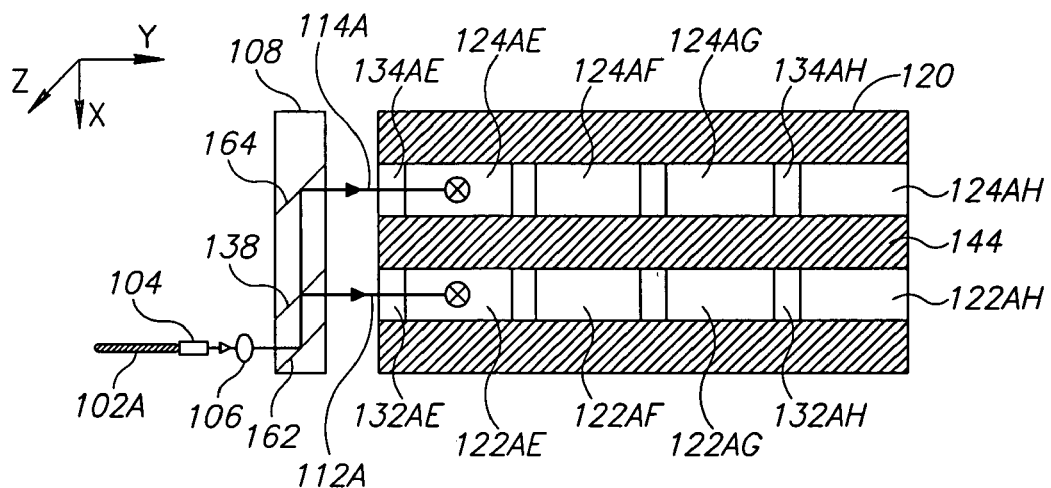
Figure 1C:
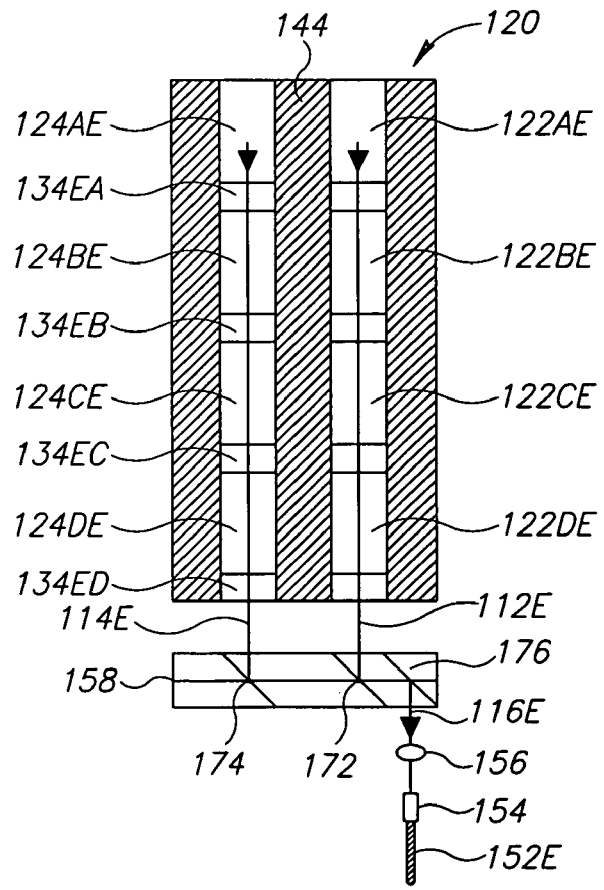

FIGS. 1A-1C show from different directions, a 4×4 optical switch 100, in accordance with an exemplary embodiment of the invention. Switch 100, as shown in FIG. 1A, receives input light beams through input fibers 102 (marked 102A, 102B, 102C and 102D) which are optionally coupled to respective collimators 104 and collimating lenses 106. Collimated beams 110 (marked 110A, 110B, 110C and 110D) from lenses 106 are forwarded to a polarization beam splitter (PBS) 108, which decomposes the input beams 110 into separate beams 112 (marked 112A, 112B, 112C and 112D) and 114 (FIG. 1B, only beam 114A is shown), which are orthogonally polarized relative to each other. A two layer switching array 120 selectively directs the light beams toward a specific output fiber 152 from an array of output fibers 152E, 152F, 152G and 152H. In entering the specific output fiber 152, the pairs of orthogonally polarized beams 112 and 114 are optionally recombined by a beam combiner 158, and directed through a lens 156 and collimator 154 into the output optical fiber 152.

Two layer switching array 120 optionally includes a first two-dimensional rectangular array, 4×4 in FIG. 1A, of semi-transparent mirrors 122 (marked 122AE, 122AF, etc., according to the letters of the row and column) for beams 112 and a second two-dimensional rectangular array, of the same size as the first array, of semi-transparent mirrors 124 (only shown in FIGS. 1B and 1C) for beams 114.

Controllable polarization rotators 132 (marked with letters according to row and column) are located before each semi-transparent mirror 122 in the rows of input fibers 102 and after each semi-transparent mirror 122 along the columns leading to output fibers 152. In a similar manner, controllable polarization rotators 134, which may be of the same type as rotators 132, are located before and after semi-transparent mirrors 124. In the following description, semi-transparent mirrors 122 and 124 only reflect light of S-polarization, while P-polarization passes through the mirrors 122 and 124 undisturbed. It will be understood to those skilled in the art that any of the embodiments described herein may be modified to use semi transparent mirrors which reflect P-polarized light and transmit S-polarized light undisturbed.

Beam Splitter and Combiner

With reference to FIG. 1B, beam splitter 108 decomposes each input beam 110 to its S-polarization and P-polarization components, directing the S-polarization light into one layer of array 120 and P-polarization light into a second layer of array 120.

In some embodiments of the invention, beam splitter 108 comprises a polarization beam splitter 138, which directs S-polarization light towards the layer of semi-transparent mirrors 122 (as beam 112), but allows P-polarization light to pass therethrough unobstructed so that it can be directed toward the layer of mirrors 124 (as beam 114). It is noted, however, that an opposite arrangement, directing S-polarized light in beam 114 and P-polarized light in beam 112, may be used equivalently.

In an exemplary embodiment of the invention, within beam splitter 108, a mirror 162 directs light beams 110, including all their polarization components, from input fibers 102 to polarization beam splitter 138. Alternatively, input fibers 102 are located in the plane of the layer of mirrors 122, such that mirror 162 is not required.

Optionally, within beam splitter 108, a mirror 164 directs the remaining light passing unobstructed through polarization beam splitter 138, i.e., the P-polarized light, to the layer of mirrors 124. Mirror 164 may be a simple mirror or may be a selective mirror which deflects only P-polarized light. Alternatively, a polarization rotator, for example a fixed rotation waveplate, is positioned between polarization beam splitter 138 and mirror 164, and mirror 164 directs S polarized light towards mirrors 124.

Mirrors 162 and 164 and/or beam splitter 138 may be single units having sufficient length to service the entire array of beams 110 or may include separate units for each beam 110. Intermediate solutions may also be used, such as a separate mirror for each two input optical fibers 102.

Alternatively to using a polarization beam splitter 138, a birefringant element is used to separate beams 110 into their polarization components.

Beam combiner 158 optionally operates in an opposite manner to that of splitter 108. For each output fiber 152, a mirror 174 is configured to collect light beams from the layer of mirrors 124 and a PBS 172 is directed to combine the light beams from the layer of mirrors 122, thereto. The combined light beams 116 are directed to output optical fibers 152, for example by a mirror 176. Alternatively to using a PBS 172 to combine the beams, a semi-transparent mirror may be used.

While the above description uses semi-transparent mirrors in splitting the input beams into their polarization components, any other suitable apparatus may be used to perform the splitting, such as a calcite plate or any of the apparatus suggested to perform the splitting in the patent publications mentioned in the background section of the present application. Optionally, the splitting device used is designed to achieve a separation between polarized beams 112 and 114, which prevents substantial cross-talk between the beams, while they propagate in their different planes. The distance between the parallel beams 112 and 114 is optionally at least 500 microns or even at least 1 millimeter. On the other hand, the distance between the parallel beams 112 and 114 is optionally less than 5 millimeters or even less than 2 millimeters in order to limit the propagation paths of the beams. In some cases, the separation between the polarization components is sufficiently large, such that the polarization components pass on opposite sides of one or more optical elements.

In some embodiments of the invention, when the splitting apparatus achieves a relatively small separation, mirrors and/or lenses are optionally used to further separate the polarized component beams to the desired extent.

In some embodiments of the invention, a separation layer 144 comprising a material that is opaque to the wavelengths of the switched light is placed between the layers of beams 112 and 114, to inhibit crosstalk therebetween. In accordance with these embodiments, the distance between beams 112 and 114 may be smaller than required without the opaque separation layer, for example smaller than 500 millimeters or even smaller than 300 millimeters. Separation layer 144 optionally comprises a thin layer of a conductor, having a complex or negative permittivity, for example copper and/or aluminum.

In other embodiments of the invention, rather than including separate semi-transparent mirrors 122 and 124, single larger semi-transparent mirrors for both of beams 112 and 114 may be provided. Alternatively or additionally, one or more of the pairs of polarization rotators 132 and 134 are replaced by a single larger polarization rotator.

Collimators 104 and collimating lenses 106 may be of any suitable type known in the art, including a GRIN lens, a glass-like rod lens or a spherical lens. The semi-transparent mirrors may also be fabricated from various materials, including, for example, glass and/or chemical layers.

Controller

A controller 118 (FIG. 1A) electronically controls polarization rotators 132 and 134 as to whether the polarization of light directed to any specific semi transparent mirror 122 or 124 or received from any specific semi-transparent mirror will be rotated. For simplicity of FIG. 1A, the control lines connecting controller 118 to the elements of switch 100 are not shown.

Generally, a beam which is received from beam splitter 108 with an S-polarization will be rotated by the respective polarization rotator 132xE or 134xE (x standing for the letter A, B, C, D of the specific row) upon its entrance to array 120, so that it is not deflected until desired. Before the semi transparent mirror 122 or 124 at which the beam is to be deflected, the polarization rotator 132 or 134 is set to an active state to cause the polarization of the beam to be changed so that the beam is deflected. The polarization rotator 132 or 134 positioned immediately after the semi transparent mirror 122 or 124 deflecting the beam, is set to the active state, to prevent the beam from being deflected in the next semi transparent mirror 122 or 124 in the column. In leaving array 120, beams 112 that need to be deflected by PBS 172 are rotated by polarization rotator 132xD (x being the letter representing the specific column).

When a polarization rotator 132 or 134 needs to be made active for two different reasons, the polarization rotator is set to its passive state, as the rotations cancel each other. That is, when a S-polarization beam 112 needs to be deflected onto the first column (the E column) of array 120, the respective polarization rotator 132 is set to a passive state, as the beam 112 is already S-polarized for the deflection. In addition, when a beam 112D is deflected by a semi-transparent mirror 122, the rotator 132xD is set to its passive state, as the rotation after deflection and the rotation before deflection by PBS 172 cancel each other. It is noted that a beam 112 directed from input optical fiber 102D to output optical fiber 152E is not rotated at all by rotators 132. In contrast, its parallel beam 114 is rotated twice, once by rotator 134DE and once by rotator 134ED. On the other hand, a beam directed from input fiber 102A to output fiber 152H is rotated twice in the layer of semi-transparent mirrors 124 and four times in the layer of semi-transparent mirrors 122.

Alternatively to allowing different components of the same input beam to undergo different numbers of polarization rotations, the different components of a single input beam are required to perform the same number of rotations, thereby preventing distortions when recombined. Accordingly in accordance with this alternative, two rotations may be performed consecutively, even if their effects cancel each other out.

Switching Operation

In the example shown in FIGS. 1A-1C, controller 118 sets the rotation states of controllable rotators 132 and 134 to direct light beam 110A into output fiber 152E, light beam 110B into output fiber 152F, light beam 110C into output fiber 152H and light beam 110D into output fiber 152G.

Referring to input beam 110A received through input fiber 102A, the beam is split into an S-polarized beam 112A and a P-polarized beam 114A (FIG. 1B). Rotator 132AE is set by controller 118 to a passive state, such that S-polarized beam 112A is reflected by semi-transparent mirror 122AE. Rotator 132EA is set to an active state in which it converts the deflected beam from semi-transparent mirror 122AE, annotated as beam 112E, from S-polarization to P-polarization, such that beam 112E passes transparently through semi-transparent mirror 122BE. Polarization rotators 132EB and 132EC are set to the passive state, such that beam 112E proceeds uninterrupted as a P-polarized beam toward PBS 172 (FIG. 1C). Upon the exit of beam 112E from array 120, its polarization is converted from P-polarization to S-polarization, by polarization rotator 132ED, so the beam 112E is deflected by PBS 172. As beam 112A does not reach polarization rotators 132AF, 132AG and 132AH, their values may be undefined or selected arbitrarily.

As to P-polarized beam 114A, rotator 134AE (FIG. 1B) is set to the active state, so that beam 114A is S-polarized and deflected by semi-transparent mirror 124AE. Rotator 134EA (FIG. 1C) is set to an active state in which it converts the deflected beam, referred to as beam 114E, from S-polarization to P-polarization, such that beam 114E passes transparently through semi-transparent mirror 124BE. Polarization rotators 134EB and 134EC are set to the passive state, such that beam 114E proceeds uninterrupted as a P-polarized beam toward mirror 174. Polarization rotator 134ED is also set to a passive state, so that beam 114E reaches mirror 174 P-polarized, and therefore is not deflected by PBS 172. As beam 114A does not reach polarization rotators 134AF, 134AG and 134AH, their values may be undefined or selected arbitrarily.

Rotation Control

In some embodiments of the invention, controller 118 controls each of the sixty four polarization rotators 132 and 134 separately. Alternatively, some or all of polarization rotators 132 and 134 are controlled together. Optionally, in accordance with this alternative, except for rotators 132xE, 134xE, 132xD and 134xD, the pairs of rotators 132yz and 134yz are controlled together to have the same state, so that the different polarization components of light beams are directed in the same direction. In some embodiments of the invention, rotators 132xE and 134xE are controlled together to assume opposing states, as the polarized light beams 112 and 114 enter array 120 with different polarizations. Alternatively or additionally, rotators 132xD and 134xD are controlled together to have opposite states, as beams 112 and 114 are supplied to combiner 158 with opposite polarizations. Alternatively to rotators 132xE and 134xE and/or rotators 132xD and 134xD operating in opposite states, separate rotators are positioned outside of array 120, for example coupled to splitter 108 and/or combiner 158, such that all of the rotators of array 120 can be controlled in pairs 132 and 134. It is noted, however, that one advantage of some embodiments of the invention is that there is no need for such separate rotators outside of array 120, thus reducing the maximal number of rotations applied to a beam.

Array Size

While the above description relates to a 4×4 array, it will be appreciated that the concept is scalable, and embodiments of the invention may incorporate arrays of other sizes. In fact, arrays with more than 5×5, more than 8×8 and even more than 10×10 inputs and outputs may be used. It is further noted that the switch need not have the same number of inputs and outputs, but rather may have more inputs than outputs or more outputs than inputs. Of course, in such embodiments at any time, some of the inputs or outputs are not used.

As using current technology the collimating of light beams is imperfect, the propagation paths of the beams within switch 100 are preferably kept to a minimum, in order to minimize losses. Optionally, array 120 is kept small, in order to limit the lengths of the beam paths within the array. In some embodiments of the invention, array 120 is smaller than 5×5 centimeters, smaller than 2×2 centimeters or even is not greater than 1×1 centimeter. The number of rows and lines and their dimensions are optionally selected in a manner which keeps the size of the entire array within desired limits. On the other hand, the widths of the rows and columns are optionally kept sufficiently large to minimize or even eliminate cross-talk between the beams in adjacent rows and/or columns. Optionally, the distance between the beams in two adjacent rows or columns is at least 200 microns or even at least 500 micros or more than 800 microns. By directing beams 112 and 114 within different planes, the number of beams in a single plane is reduced, and therefore more rows and columns may be provided without making array 120 too large and/or the distance between adjacent rows and columns may be increased, reducing the amount of crosstalk.

In some embodiments of the invention, in connecting fibers to the inputs and outputs of the switch, the importance and/or promised quality of service (QoS) of the beams is taken into consideration. Optionally, important input and/or output fibers are positioned in a manner which minimizes the lengths of the propagation paths of the beams within array 120. In some embodiments of the invention, important fibers are positioned close to semi-transparent mirror 122DE, which has the smallest beam propagation path.

While the array of FIGS. 1A-1C provides for switching between a relatively large number of ports, the total number of ports included in the switch is limited. In order to achieve a switch with a larger number of ports, a plurality of layers of switches in a single casing may be used, as is now described with reference to FIG. 2.

Three Dimensional Switch

Figure 2:
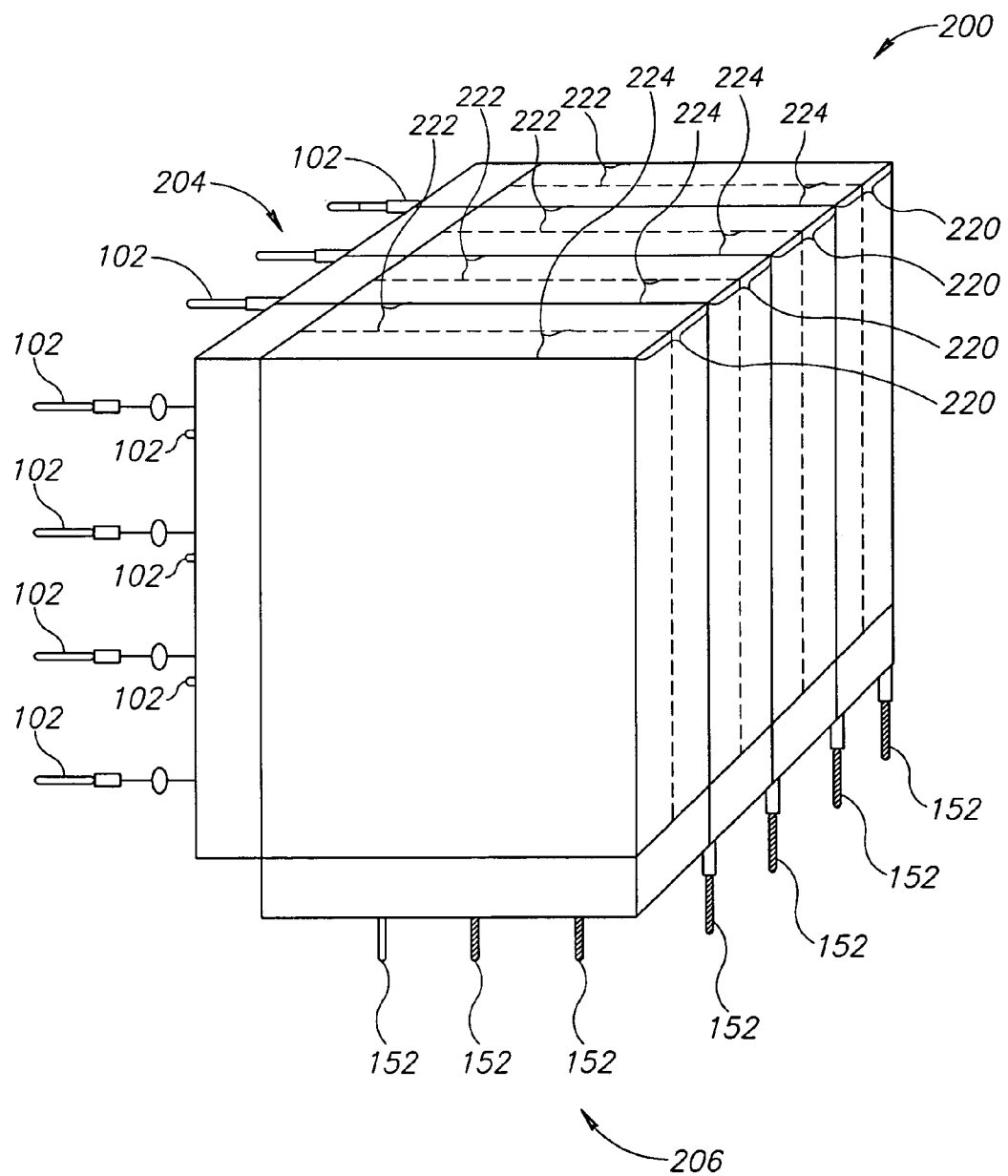
FIG. 2 is a schematic view of a multi-layer switch, in accordance with another embodiment of the invention.

FIG. 2 is a schematic view of a multi-layer switch 200, in accordance with an exemplary embodiment of the invention. Switch 200 comprises a plurality of two-dimensional switching units 220 placed one next to the other, such that their input fibers 102 are arranged in a two dimensional array of inputs on an input face 204 and their output fibers 152 form an array of output fibers on an output face 206. In an exemplary embodiment of the invention, each switching unit 220 has the structure of two-dimensional switch 100 described above with reference to FIGS. 1A-1C, including two separate planes 222 and 224 in which the different polarization components of the input beams are directed separately, in parallel. It is noted that in this embodiment, light beams entering the inputs 102 of each switching unit 220 can only be directed to the outputs 152 of that specific switching unit 220. Switch 200 thus includes a plurality of separate switching units 220 which for compactness are encased in a single casing. In other embodiments of the invention, as described below with reference to FIG. 3, switch 200 allows for directing of light beams also between switching units 220, such that light beams entering in one switching unit 220 can be switched to the outputs 152 of a different switching unit 220.

Figure 3:
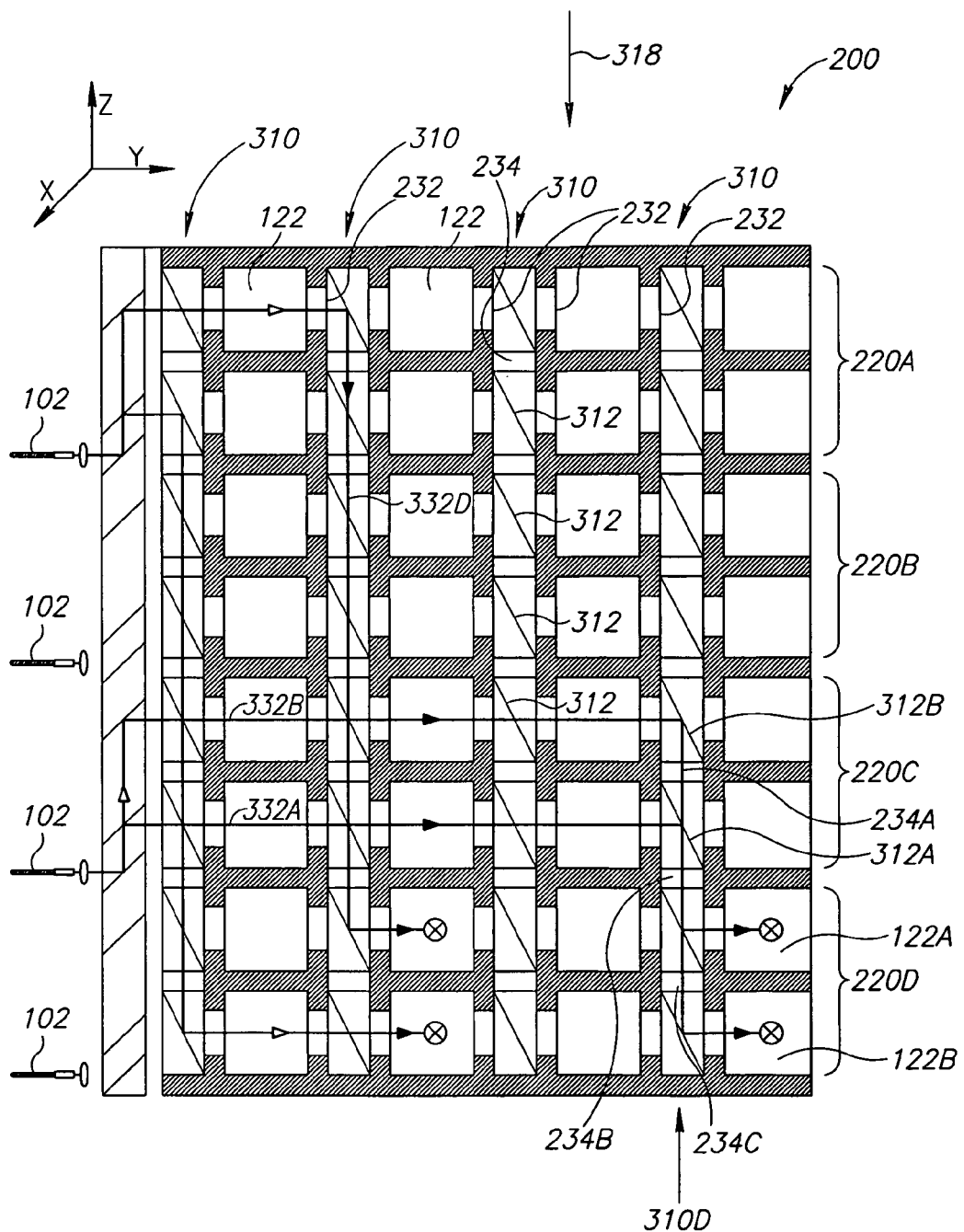
FIG. 3 is a schematic cross-section of a multi-layer switch, in accordance with one exemplary embodiment of the invention.

FIG. 3 is a cross-section of multi-layer switch 200, along a surface parallel to output face 206, in accordance with another exemplary embodiment of the invention. In the embodiment of FIG. 3, in addition to semi-transparent mirrors 122, which are used to selectively direct light beams from input fibers 102 (downward in FIG. 2) to output fibers 152, switch 200 includes rows 310 of semi-transparent mirrors 312, which are used to direct light beams between different switching units 220. In the embodiment of FIG. 3, beams can only be directed between switching units 220 in one direction, the direction indicated by arrow 318. For example, a beam entering switching unit 220B from an optical fiber 102 can be directed to output fibers 152 in switching units 220C and 220D, as well as remaining within switching unit 220B. The beam, however, cannot, in this embodiment, be directed from an input fiber 102 in switching unit 220B to an output fiber 152 in switching unit 220A. In order to direct a beam between switching units 220, the polarization rotators 232 before the row 310 in which the beam is to be deflected are set so that the beam has the required polarization for deflection. Polarization rotators 234 along row 310 are set in a manner causing the polarized beams to be directed into the desired switching unit 220.

In some embodiments of the invention, both polarization components of the directed light beam are transferred along the same row 310, as illustrated by light beam 332. Light beam 332 is split into polarization orthogonal components 332A and 332B which are directed in parallel within switching unit 220C until they reach row 310D onto which they are deflected. Before row 310D, the beam polarizations are changed by polarization rotators 232 to have S-polarization, so polarized beams 332A and 332B are deflected onto row 310D by semi-transparent mirrors 312A and 312B, respectively. After being deflected, the polarization of beam 332B is changed to P-polarization by polarization rotator 234A, so that it is not deflected by semi-transparent mirror 312A. Polarization rotator 234B receives beam 332B in P-polarization and beam 332A in S-polarization and changes their polarization. The polarization of beam 332B is converted into S-polarization, such that beam 332B is deflected by semi-transparent mirror 312C, toward semi-transparent mirror 122A at which it is deflected toward output fibers 152 (downwards in FIG. 3). The polarization of beam 332A is changed by polarization rotator 234B to P-polarization, such that it proceeds further along row 310D. At polarization rotator 234C, the polarization of beam 332A is changed again, so that the beam is deflected toward semi-transparent mirror 122B for transmission toward output fiber 152 (into the page in FIG. 3).

Transmitting both polarization components along the same row 310 reduces the size of switch 200, but may cause reduction in quality due to interference between the beams. Therefore, in some embodiments of the invention, the transmission along the same row is performed only for a small portion of the paths of the beams, for example only along rows 310 (X-direction) and not in the Z and Y directions. Alternatively, the different polarization components are directed along two different rows 310, as illustrated by beams 332C and 332D. This alternative may be used when the rows 310 are not all required for beams received through other input fibers 102, for example if not all inputs are used concurrently and/or if some of the input beams do not need to be reflected in the X-direction or need to move only for a short distance in the X-direction such that a single row 310 can be used for two different beams. The use of two different rows 310 is also not suitable for beams directed to output fibers on the first row closest to input fibers 102. Controller 118 is optionally configured to select the paths of the beams giving preference to using two rows 310 when possible.

Figure 4:
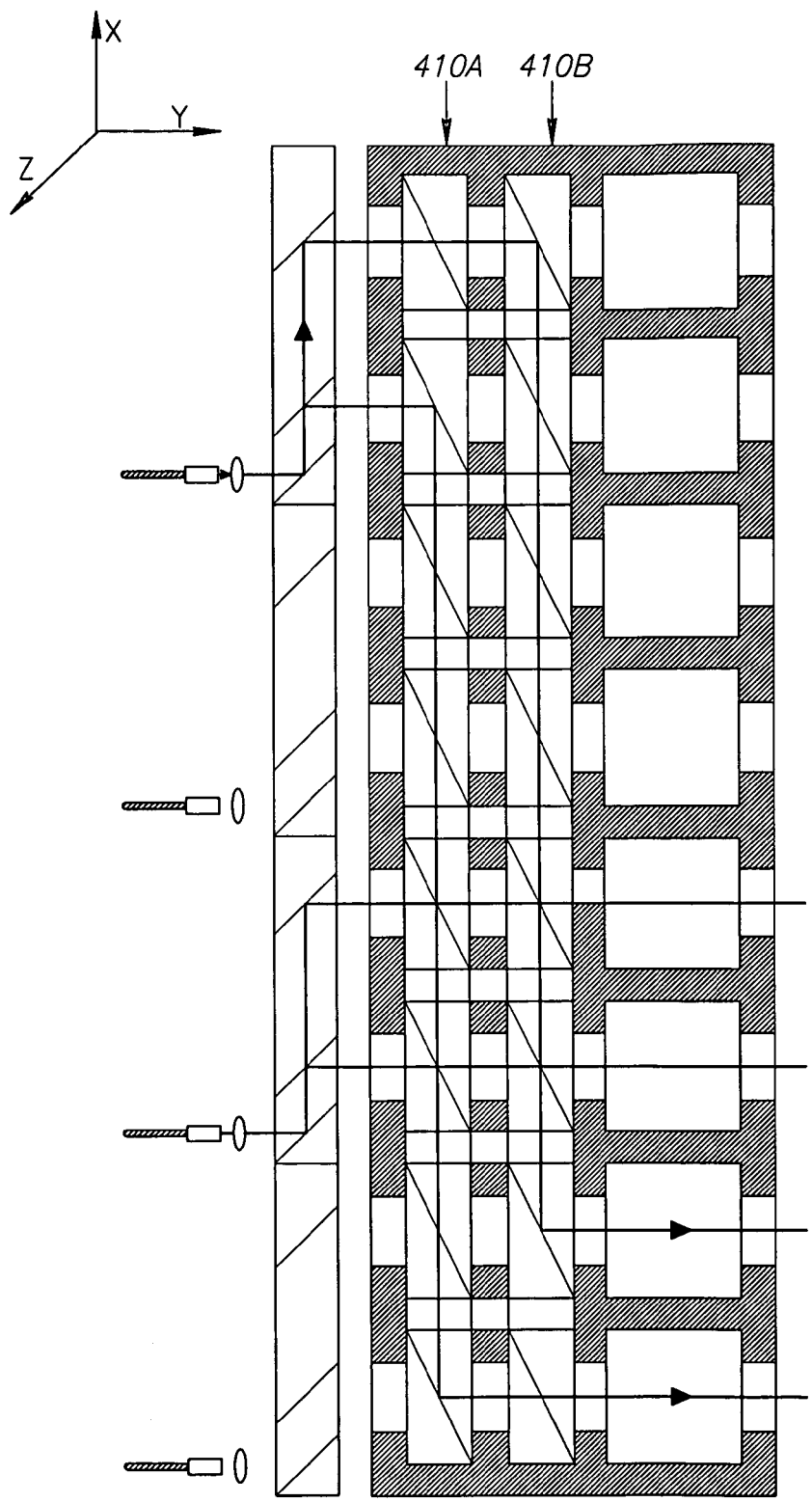
FIG. 4 is a schematic cross-section of a multi-layer switch, in accordance with another embodiment of the invention.

FIG. 4 is a schematic cross-section view of a left-most row of multi-layer switch 200, in accordance with another exemplary embodiment of the invention. In the embodiment of FIG. 4, the first row 310 of FIG. 3 is replaced by two rows 410A and 410B such that for the first row, the different polarization beams can be directed in different paths. It will be understood, that two parallel rows for separate direction of the different polarization components may be used also for other rows 310, possibly for all the rows.

Figure 5:
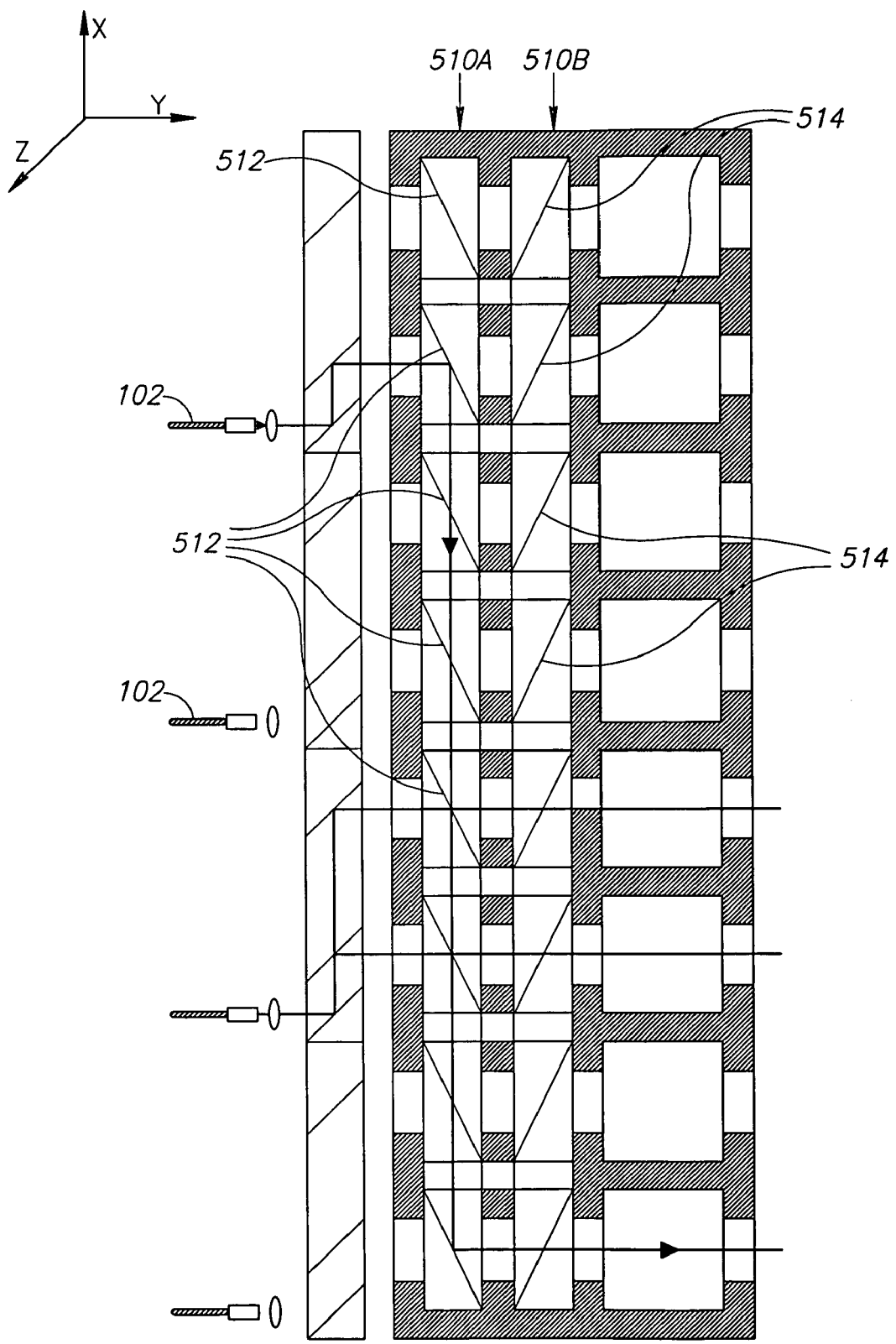
FIG. 5 is a schematic cross-section of a multi-layer switch, in accordance with still another embodiment of the invention.

FIG. 5 is a schematic cross-section of a left-most row of multi-layer switch 200, in accordance with still another exemplary embodiment of the invention. In the embodiment of FIG. 5, the first row 310 of FIG. 3 is replaced by two rows 510A and 510B having semi transparent mirrors 512 and 514, respectively, directed in opposite directions, allowing deflection of beams from any input fiber 102 to any output fiber 152.

In some embodiments of the invention, each of rows 510A and 510B is formed of two separate rows which separately direct the different polarization components of the beam. In other embodiments of the invention, in order to reduce the number of components required, only a single row is used, as shown in FIG. 3. However, in these embodiments, some of the rows are directed in one direction, while the other rows are directed in the opposite direction. For example, the first and third rows may have semi-transparent mirrors directed in a first direction, while the second and fourth rows have semi-transparent mirrors directed in the other direction. Alternatively or additionally, the rows in different Z-direction levels have opposite directions. Controller 118 selects a beam path for directing the beams, possibly passing through an intermediate Z-direction level for the X-direction propagation.

Other Embodiments

Figure 6:
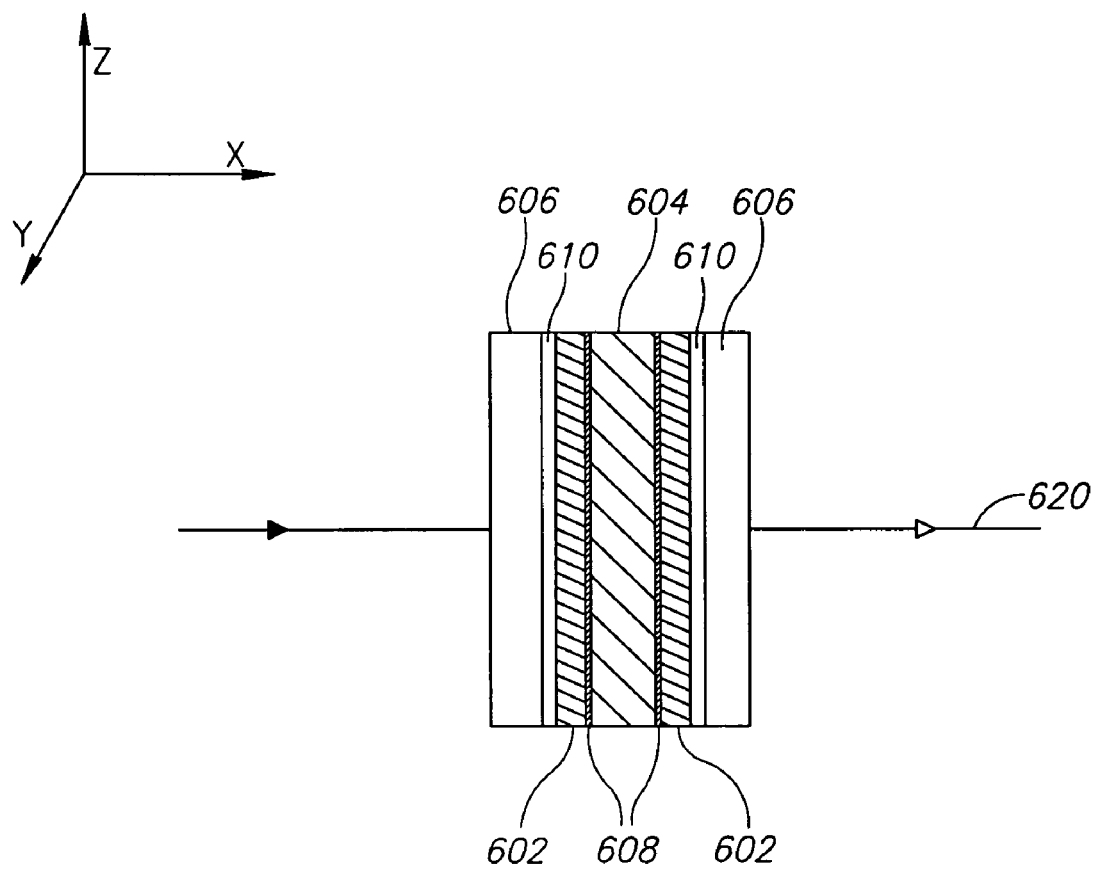
FIG. 6 is a schematic cross-section view of a controllable polarization rotator, in accordance with an exemplary embodiment of the invention.

It will be appreciated that the advantages of directing the different polarization components of a beam in different planes and/or through different optical apparatus are not limited to any specific switch structure. Any of the two-dimensional switch structures described in the patents mentioned in the background section of the present application, such as that shown in FIG. 2 of U.S. Pat. No. 6,275,312, may be converted into a structure which allows separate deflection of the different polarization components of the input beams by duplicating their two dimensional switch structure. Similarly, three-dimensional switching structures, such as shown in FIG. 6 of U.S. Pat. No. 6,992,748, may be converted into a structure which allows separate deflection of the different polarization components of the input beams by duplicating each two dimensional slice of the switch. Alternatively, an existing switch may be used for separate propagation of different polarization components by using a first switching point of the switch as a beam separation point rather than as a beam switching point.

It is noted, however, that the rectangular switch structures shown in FIGS. 1A-5 have the advantage that they minimize the average and/or the maximal number of deflections that a beam undergoes in passing through the switch. In switch 100, ignoring the separation of the input beam into polarization components, all input beams are deflected only once on their way to the output fiber, and hence are efficiently transmitted with low losses. Even with the beam separation, the maximal number of deflections is optionally no greater than five, two in the separation, two in the combination and once in the switching. In the three dimensional switches, the number of deflections not including the separation and combination is optionally no more than ten, optionally less than five.

Controllable Polarization Rotators

Controllable polarization rotators 132 and 134 may be of any type known in the art, such as any of those described in the patent publications listed in the background section of the present application. In some embodiments of the invention, controllable polarization rotators 132 and 134 comprise electrically controlled cells and/or magnetically controlled cells.

FIG. 6 is a schematic cross-section view of a controllable polarization rotator 600, in accordance with an exemplary embodiment of the invention. Rotator 600 comprises a cavity 604 filled with a ferroelectric material, such as a ferroelectric liquid crystal. Cavity 604 is surrounded on both sides by transparent electrodes 602, which are coupled to cavity 604 through respective aligning layers 608, comprising for example a polymeric material such as polyimide. In some embodiments of the invention, the electrodes are covered by an anti-reflecting layer 610, such as $M_gF_2$ and protective outer layers 606, for example formed of silica glass.

The transparent electrodes optionally comprise Indium Tin Oxide (ITO) electrodes and/or any other material which is both a good conductor and transparent to light handled by switch 100.

When a voltage difference is applied between electrodes 602, the ferroelectric material within cavity 604 is aligned in a manner which causes the polarity of light beams passing through the cavity to rotate by 90° ($=\pi/2$). When a voltage is not applied, the molecules of the ferroelectric material are orthogonal to incident light beams, which thus pass through controllable polarization rotator 600 without being deflected.

Using a ferroelectric material in controllable polarization rotator 600, achieves a relative small attenuation factor, a fast response time and a low warm up, since the ferroelectric material layer may be very thin (e.g., less than 10 or even less than 5 microns) and very low voltage and current levels are required to control the orientation of the molecules of the ferroelectric material. Since the layer of the LC inside the cavity is very thin (only several microns), very low voltage (e.g., 1.5 V, and substantially no current at all) is needed to control the molecules and hence only minimal warm up occurs.

Alternatively to using a ferroelectric material, in other embodiments of the invention cavity 604 includes a birefringent piezoelectric material, having an optical axis in a direction (the Z direction in FIG. 2) orthogonal to the direction of propagation of light through the rotator, illustrated by beam 620 in FIG. 2. The voltage applied between electrodes 602 is controlled so that in an active state of rotator 600 the birefringent material has a width causing a 90° polarization rotation and in a passive state the birefringent material has a width causing a 180° polarization rotation.

In other embodiments of the invention, some or all of the controllable polarization rotators 132 and 134 comprise Faraday Rotation cells, also known as Maxwell Rotation cells, containing nanomagnetic particles within a transparent substrate. The transparent substrate may include, for example, an aero gel Silica or Titania (e.g., $SiO_2$ or $TiO_2$) or another simple glass-like material and/or transparent materials. The nanomagnetic particles are optionally of a single magnetic domain nature, and are for example $Fe_3O_4$ nanoparticles, Maghemite, $\gamma$-$Fe_2O_3$, nanoparticles, Yttrium Garnet, Iron, Fe, Cobalt, Co, Nickel, Ni, or $CoFe_2O_3$ nanoparticles.

Fabrication

In some embodiments of the invention, the switch is assembled from a plurality of separately constructed elements (e.g., semi transparent mirrors, polarization rotators). Alternatively or additionally, array 120 and optionally the entire switch are produced by thin film deposition (e.g., a silicon or GaAs process) or by semiconductor manufacturing techniques such as, cutting, polishing and/or etching methods. For example, the semi-transparent mirrors may be produced using methods known in the art for producing Laser Diode Optical Cavities.

Alternatives

While the above description relates to an optical switch which receives input beams through optical fibers and provides output beams to optical fibers, switches in accordance with the present invention may be used with other light sources and other light receivers. For example, the light inputs may be received through other types of waveguides, such as free space wave guides or may be provided through other types of output waveguides. In still other embodiments, the light inputs may be received directly from LEDs or other light generators and/or the light outputs may lead directly to light detectors which convert the light into electrical signals. In an exemplary embodiment of the invention, one or more optical switches using any of the above embodiments, is used for switching light beams within an optical processor.

In some embodiments of the invention, an optical switch with a structure in accordance with any of the above described embodiments is immersed in a medium having a refractive index above 1. For example, a switch may be immersed in a liquid, such as an oil, so that the numerical aperture (NA) of the optics of switch 100 is larger, thereby reducing light loss. Alternatively, only the areas surrounding lenses 106 and 156 are immersed in the liquid.

Plane Definition

One way to define the planes through which a beam propagates, such as the polarization components, is based on the entrance beam and exit beam at a point at which the beam is deflected or could be deflected. For example, in FIG. 1A, beam 112A which is deflected by semi-transparent mirror 122AE, defines a plane by entrance beam 112A and exit beam 112E. This plane is considered the plane defined by semi-transparent mirror 122AE for input beams from input fiber 102A. In the embodiment of FIG. 1A, all the semi-transparent mirrors 122 define the same plane.

Conclusion

It will be appreciated that the above described methods may be varied in many ways, including, changing the specific elements used and their layout. It should also be appreciated that the above described description of methods and apparatus are to be interpreted as including apparatus for carrying out the methods and methods of using the apparatus. The present invention has been described using non-limiting detailed descriptions of embodiments thereof that are provided by way of example and are not intended to limit the scope of the invention. Many specific implementation details may be used.

It should be understood that features and/or steps described with respect to one embodiment may be used with other embodiments and that not all embodiments of the invention have all of the features and/or steps shown in a particular figure or described with respect to one of the embodiments.

Variations of embodiments described will occur to persons of the art. Furthermore, the terms "comprise," "include," "have" and their conjugates, shall mean, when used in the claims, "including but not necessarily limited to."

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims.

We claim:

1. An optical switch, comprising:
   a plurality of light inputs;
   a plurality of light outputs;
   a polarization beam splitter, configured to split light beams received through the input into separate first and second polarization components;
   a plurality of semi-transparent mirrors and polarization rotators arranged to allow controllable deflection of the first and second polarization components from the beam splitter to a selected one of the light outputs,
   wherein based on defining:
      for each of the semi-transparent mirrors through which the first polarization component may pass in the arrangement, a first respective plane as the plane formed by the directions of the possible paths of the first polarization component exiting the semi-transparent mirror in the arrangement, and
      for each of the semi-transparent mirrors through which the second polarization component may pass in the arrangement, a second respective plane as the plane formed by the directions of the possible paths of the second polarization component exiting the semi-transparent mirror in the arrangement,
   the one or more first respective planes of most of the semi-transparent mirrors do not coincide with second respective planes; and
   a controller adapted to control the beam rotators in order that the semi-transparent mirrors deflect beams from desired inputs to desired outputs,
   wherein the semi-transparent mirrors and polarization rotators are arranged such that the separate polarization components each pass through at least one separately controlled polarization rotator through which the other polarization component does not pass.

2. An optical switch, comprising:
   a plurality of light inputs;
   a plurality of light outputs;
   a polarization beam splitter, configured to split light beams received through the input into separate first and second polarization components;
   a plurality of semi-transparent mirrors and polarization rotators arranged in a two-dimensional rectangular array to allow controllable deflection of the first and second polarization components from the beam splitter to a selected one of the light outputs,
   wherein for each of the semi-transparent mirrors through which the first polarization component may pass in the arrangement, first respective planes formed by the possible paths of the first polarization component passing through the semi-transparent mirror in the arrangement are defined and for each of the semi-transparent mirrors through which the second polarization component may pass in the arrangement, second respective planes formed by the possible paths of the second polarization component passing through the semi-transparent mirror in the arrangement are defined, and
   wherein the one or more first respective planes defined for at least 15% of the semi-transparent mirrors do not coincide with second respective planes; and
   a controller adapted to control the beam rotators in order that the semi-transparent mirrors deflect beams from desired inputs to desired outputs,
   wherein the first respective planes defined for at least 30% of the semi-transparent mirrors through which the first polarization component may pass in the arrangement do not coincide with second respective planes of any of the semi-transparent mirrors in the arrangement.

3. An optical switch according to claim 2, wherein the first respective planes defined for each of the semi-transparent mirrors through which the first polarization component may pass in the arrangement do not coincide with second respective planes of any of the semi-transparent mirrors in the arrangement.

4. An optical switch according to claim 1, wherein the first respective planes defined for the semi-transparent mirrors through which the first polarization component may pass in the arrangement, are included in a plurality of different planes which do not coincide.

5. An optical switch according to claim 1, wherein the first respective planes defined for the semi-transparent mirrors through which the first polarization component may pass in the arrangement, are included in at least two substantially orthogonal planes.

6. An optical switch according to claim 1, wherein the first respective planes defined for at least 80% of the semi-transparent mirrors through which the first polarization component may pass in the arrangement, are included in a single plane.

7. An optical switch according to claim 1, wherein the first respective planes defined by all the semi-transparent mirrors through which the first polarization component may pass in the arrangement, are included in a single first plane.

8. An optical switch according to claim 7, wherein the second respective planes defined for at least 80% of the semi-transparent mirrors through which the second polarization component may pass in the arrangement, are included in a single second plane.

9. An optical switch according to claim 8, wherein the first and second planes are parallel.

10. An optical switch according to claim 1, wherein the plurality of light inputs comprise at least four inputs and the plurality of outputs comprise at least four outputs.

11. An optical switch according to claim 1, wherein the polarization beam splitter comprises a semi-transparent mirror.

12. An optical switch according to claim 1, wherein the arrangement of semi-transparent mirrors and polarization rotators comprises two layers of optical elements separated by an opaque layer, in the wavelengths of light beams for which the switch is designed.

13. An optical switch according to claim 1, wherein the semi-transparent mirrors and polarization rotators are arranged to direct the first and second polarization components distanced from each other by at least 300 microns, over at least 50% of their propagation distance within the switch.

14. An optical switch according to claim 13, wherein the semi-transparent mirrors and polarization rotators are arranged to direct the first and second polarization components distanced from each other by at least 500 microns, over at least 50% of their propagation distance within the switch.

15. An optical switch according to claim 13, wherein the semi-transparent mirrors and polarization rotators are arranged to direct the first and second polarization components distanced from each other by at least 300 microns, over at least 80% of their propagation distance within the switch.

16. An optical switch according to claim 1, wherein the semi-transparent mirrors are arranged in a rectangular array.

17. An optical switch according to claim 1, wherein the semi-transparent mirrors and polarization rotators are arranged to direct the first and second polarization components such that the maximal number of times a polarization component is deflected within the switch, along any of its possible paths, is less than 10.

18. An optical switch according to claim 17, wherein the semi-transparent mirrors and polarization rotators are arranged to direct the first and second polarization components such that the maximal number of times a polarization component is deflected within the switch, along any of its possible paths, is less than six.

19. An optical switch according to claim 1, wherein the semi-transparent mirrors and polarization rotators are arranged such that the first and second polarization components each pass through at least five separately controlled polarization rotators through which the other polarization component does not pass.

20. A method of optical beam switching, comprising:
receiving an input light beam;
separating the light beam into first and second separate polarization components;
directing the first and second polarization components through respective paths of semi-transparent mirrors and controllable polarization rotators, toward one of a plurality of outputs, wherein most of the planes defined by the first polarization component at a deflection point along its path, do not coincide with any of the planes defined by the second polarization component at its deflection points;
combining the separate polarization components into a combined beam; and
directing the combined beam through the one of the outputs.

21. A method according to claim 20, wherein none of the planes defined by the first polarization component at deflection points along its path coincide with any of the planes defined by the second polarization component at its deflection points.

22. A method according to claim 20, wherein the planes defined by the first polarization component at deflection points along its path are all included in a single first plane.

23. A method according to claim 22, wherein the planes defined by the second polarization component at deflection points along its path are all included in a single second plane.

24. A method according to claim 23, wherein the first and second single planes are parallel to each other.

25. A method according to claim 20, wherein the separate polarization components are distanced from each other by at least 300 microns over most of their separate propagation paths.

26. A method according to claim 20, wherein the separate polarization components propagate on opposite sides of an opaque separator over most of their separate propagation paths.

27. A method according to claim 20, wherein separating the light beam into a plurality of separate polarization components comprises separating by a birefringant element.

28. A method according to claim 20, wherein separating the light beam into a plurality of separate polarization components comprises separating by a polarization beam splitter.

29. A method according to claim 20, wherein the path of the first polarization component includes at most eight deflection points.

30. An optical switch according to claim 2,
wherein the first and second polarization components are directed at least along 20% of their paths on opposite sides of an opaque layer in the wavelengths for which the switch is designed.

31. A switch according to claim 30, wherein the first and second polarization components are directed at least along 80% of their paths on opposite sides of the opaque layer.

32. An optical switch according to claim 2,
wherein, in the arrangement, the first and second polarization components pass on opposite sides of at least one of the polarization rotators.

33. A switch according to claim 32, wherein, in the arrangement, the first and second polarization components of at least 50% of the input beams pass on opposite sides of at least five of the polarization rotators.

* * * * *

UNITED STATES PATENT AND TRADEMARK OFFICE
CERTIFICATE OF CORRECTION

| | | |
|---|---|---|
| PATENT NO. | : 8,094,979 B2 | Page 1 of 1 |
| APPLICATION NO. | : 12/221870 | |
| DATED | : January 10, 2012 | |
| INVENTOR(S) | : Avner Safrani et al. | |

It is certified that error appears in the above-identified patent and that said Letters Patent is hereby corrected as shown below:

Title Page:

Item 73: Assignee

Delete "Teliswitch Solutions Ltd." And insert --TELIWARE LTD.--

Signed and Sealed this
Fifth Day of February, 2013

Teresa Stanek Rea
*Acting Director of the United States Patent and Trademark Office*